United States Patent [19]
Ohnuki

[11] Patent Number: 5,212,744
[45] Date of Patent: May 18, 1993

[54] COMPACT OPTICAL SWITCH

[75] Inventor: Kazumitsu Ohnuki, Tokyo, Japan

[73] Assignee: Nihon Kaiheiki Kogyo Kabushiki Kaisha, Tokyo, Japan

[21] Appl. No.: 772,678

[22] Filed: Oct. 7, 1991

[30] Foreign Application Priority Data

Oct. 9, 1990 [JP] Japan .............. 2-106033[U]

[51] Int. Cl.$^5$ .............................................. G02B 6/36
[52] U.S. Cl. ................................................... 385/16
[58] Field of Search ....................................... 385/16

[56] References Cited

U.S. PATENT DOCUMENTS 4,878,722 11/1989 Nelson et al. ................. 385/16
4,893,891 1/1990 Fujita et al. .................... 385/16

FOREIGN PATENT DOCUMENTS 0298911 12/1990 Japan ............................ 385/16

Primary Examiner—Akm E. Ullah

[57] ABSTRACT

A compact control-type optical switch includes a control knob provided on the obverse surface of a lid; a switching member slidable right and left in a housing; a substantially trapezoidal prism disposed on the undersurface of the switching member; and a plurality of optical receptacles provided on the bottom of the housing. The control knob is actuated, and thereby the prism slides on the optical receptacles to change an optical path.

9 Claims, 2 Drawing Sheets

COMPACT OPTICAL SWITCH

BACKGROUND OF THE INVENTION

The present invention relates to a control-type optical switch and, more particularly, to a compact and short optical switch.

As shown in FIG. 5, in a conventional optical switch, a triangular prism 25 is moved so that light is refracted to change an optical path.

In such a conventional optical switch, the prism 25 is interlocked with a control knob 31 and is moved to change the optical path. Because of the shape of the prism 25, there is a limit to the size of the switch, such as the height, and it is difficult to miniaturize the switch.

SUMMARY OF THE INVENTION

The present invention has been made to solve the above problem of the conventional art. The object of the invention is therefore to provide a compact, novel optical switch capable of completely intercepting light. The height of a switching member supporting a prism is shortened by approximately half the height of a conventional switching member so that it can smoothly slide and the switch can smoothly operate.

To achieve the above object, this invention provides a compact optical switch comprising: a control knob provided on an obverse surface of a lid; a switching member slidable right and left in a housing; a substantially trapezoidal prism disposed on an undersurface of the switching member; and a plurality of optical receptacles provided on the bottom of the housing; wherein the control knob is actuated, and thereby the prism slides on the optical receptacles to change an optical path.

According to this invention, because of the above construction, the control knob is actuated, and thereby the prism slides on the optical receptacles to change the optical path. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 1:
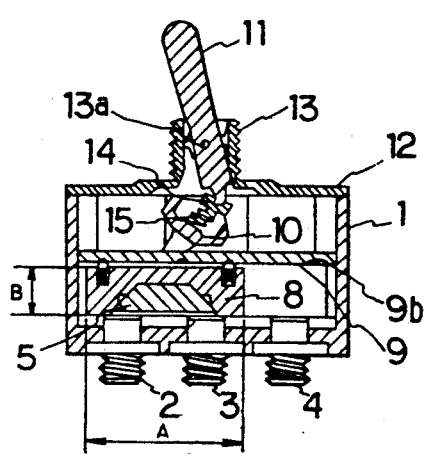
FIG. 1 is a cross-sectional view showing an embodiment of an optical switch in accordance with the present invention.
Figure 3:
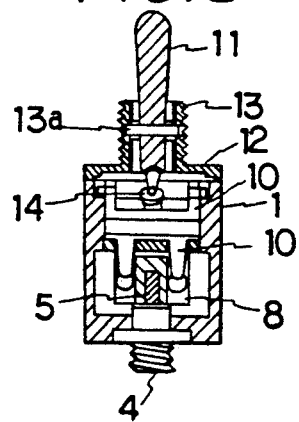
FIG. 3 is a side view of the optical switch in accordance with the invention.
Figure 4:
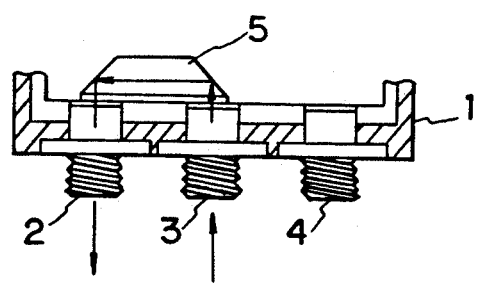
FIG. 4 is an enlarged cross-sectional view showing the main portion of the optical switch in accordance with the invention.
Figure 2:
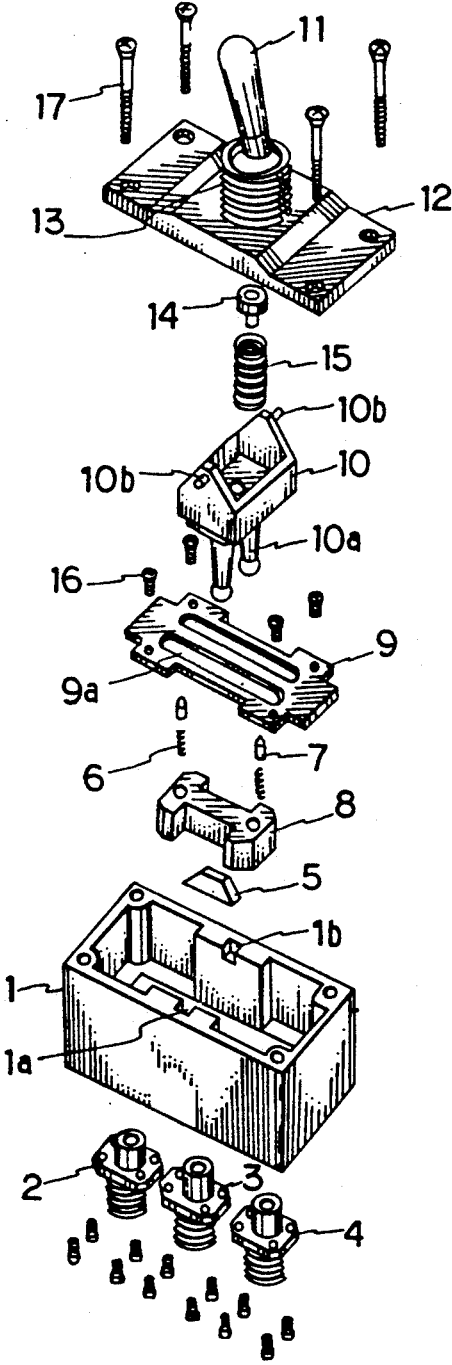
FIG. 2 is an exploded perspective view of the optical switch in accordance with this invention.
Figure 5:
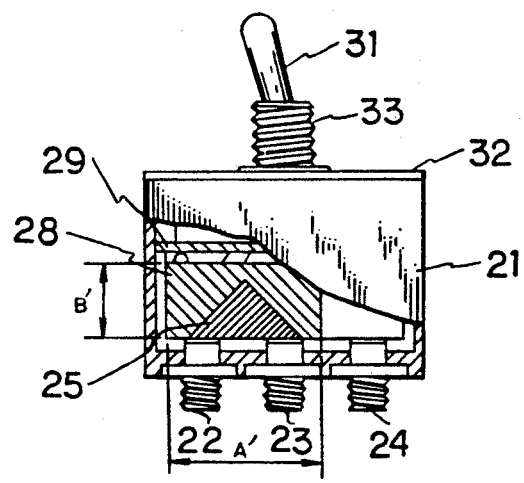
FIG. 5 ia a cross-sectional view essentially showing the conventional optical switch.

The preferred embodiment of the present invention will be described below in detail with reference to the drawings for a better understanding of its constructions and features.

Referring to FIGS. 1 to 4, which show the preferred embodiment of a compact optical switch in accordance with this invention, optical receptacles 2, 3 and 4 for connecting optical fibers are arranged at regular intervals on the bottom of an open housing 1. A trapezoidal prism 5 is disposed at the center of the bottom of the housing 1. A substantially H-shaped switching member 8 is disposed to which slidable rods 7 are attached together with springs 6. A plate 9 is secured to the switching member 8 as, for example, by screws 16.

The thus-disposed switching member 8 is capable of sliding right and left between the bottom of the housing 1 and the plate 9, with the aid of the slidable rods 7. Parallel oblong holes 9a are formed in the plate 9. Projections 10a of an operating member 10, described later, are inserted into the oblong holes 9a so that the central portion of the substantially H-shaped switching member 8 is clamped by and engaged with the projections 10a. The projections 10a are interlocked with a control knob 11, thereby actuating the switching member 8. Any switching member may be used as the switching member 8 so long as it is constructed in such a manner that it provides little friction and is capable of sliding right and left. Four holes 9b, with which the tips of the slidable rods 7 are engaged, are formed in the undersurface of the plate 9. As shown in FIG. 1, when the receptacles 2 and 3 are joined to the prism 5, one slidable rod 7 is engaged with the leftmost hole 9b, the other slidable rod 7 being engaged with the third hole 9b from the left of the plate 9. On the other hand, when the receptacles 3 and 4 are joined to the prism 5, one slidable rod 7 is engaged with the second hole 9b from the left of the plate 9, the other slidable rod 7 being engaged with the rightmost hole 9b.

Shafts 10b are affixed to both sides of the operating member 10 and are loosely fitted into recesses of the housing 1. The operating member 10 is thereby free to rock.

A sleeve 13 projects from a lid 12 which covers an opening of the housing 1 and is integrally formed with the lid 12. The control knob 11 in the sleeve 13 is supported by an axis 13a. A coiled spring 15, serving as a connecting member, together with a connector 14, is disposed between the control knob 11 and the operating member 10. The gap between the sleeve 13 and the control knob 11, axially supported by the sleeve 13, is covered with a material, such as an elastic member, so that water and dust can be prevented from entering this gap. Similarly, an elastic member is interposed between the housing 1 and the lid 12, and these components are secured to each other as, for example, by screws 17.

When the control knob 11 of the thus-constructed optical switch is actuated, the projections 10a of the operating member 10 slide the switching member 8, whereby an optical path is changed between the optical receptacles 2, 3 and 4.

When the conventional triangular prism is employed, because of the distance between the optical receptacles, the height of the conventional optical switch inevitably increases. It is thus difficult to shorten the height of the switch. However, the present invention can provide a shorter optical switch since a substantially trapezoidal prism is disposed on the undersurface of the switching member, and since the prism slides on a plurality of optical receptacles, provided on the bottom of the housing, so as to change the optical path.

Because of the shape of the substantially trapezoidal prism attached to the switching member, the height of the switching member can be shortened by approximately half the height of the conventional switching member. When the switching member slides right and left, it inclines because of the play up and down. A shorter switching member, however, can solve the inclination problem. Thus the optical switch of this invention is capable of smoothly changing the optical path.

The substantially trapezoidal prism sliding right and left is disposed at the center of the undersurface of the switching member. It is therefore possible, regardless of the height of the prism, to set the space between the optical receptacles so that optical fibers can be easily connected. This is a feature of this invention.

It is possible to form a switching member having a shortened height because the prism has the shape of a trapezoid in the above construction. For this reason, the switching member slides right and left stably since it does not incline or warp. The present invention provides an optical switch which is capable of quickly changing an optical path and has better resolution and operating characteristics.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What I claim is;

1. A compact optical switching comprising:
    a housing;
    a lid for the housing;
    a control knob provided on an obverse surface of the lid;
    a switching member linearly reciprocable right and left in the housing;
    a substantially trapezoidal prism disposed on an undersurface of the switching member; and
    a plurality of optical receptacles provided on the bottom of the housing;
    wherein when the control knob is actuated, the prism linearly reciprocates on the optical receptacles to change an optical path.

2. The compact optical switch according to claim 1, wherein the switching member has a substantial H shape, and the prism is disposed generally at the center of the undersurface of the switching member.

3. The compact optical switch according to claim 2, wherein an operating member is disposed so as to clamp the central portion of the substantial H shape of the switching member.

4. The compact optical switch according to claim 3, wherein the operating member is pivotably attached to the interior of the housing and has two depending shafts which clamp the central portion of the switching member.

5. The compact optical switch according to claim 4, further comprising a plate disposed between the operating member and the switching member, the plate having a plurality of recesses on an underside thereof, the switching member further having at least one rod which is detachably received in different recesses in the plate as the switching member and prism linearly reciprocate.

6. The compact optical switch according to claim 5, further comprising a spring and connector which interconnect an end of the control knob with the operating member.

7. The compact optical switch according to claim 1, wherein the trapezoidal prism has two generally parallel sides and two sloping sides, lines passing through the sloping sides of the prism meet at an acute angle.

8. The compact optical switch according to claim 1, wherein the trapezoidal prism has first and second parallel sides and sloping sides, the sloping sides extend between the first and second parallel sides, first angles being formed between the first parallel side and each of the sloping sides and second angles being formed between the second parallel side and each of the sloping sides, the first angles each being acute angles and the second angles each being obtuse angles.

9. The compact optical switch according to claim 1, wherein the trapezoidal prism has an upper side and a lower side with the upper side being smaller than the lower side.

* * * * *